(12) United States Patent
Risch et al.

(10) Patent No.: US 9,188,754 B1
(45) Date of Patent: Nov. 17, 2015

(54) METHOD FOR MANUFACTURING AN OPTICAL-FIBER BUFFER TUBE

(71) Applicant: Draka Comteq B.V., Amsterdam (NL)

(72) Inventors: Brian G. Risch, Granite Falls, NC (US); Denise Lorraine Collado, Newton, NC (US); Don Parris, Newton, NC (US)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 13/833,839

(22) Filed: Mar. 15, 2013

(51) Int. Cl.
G02B 6/44 (2006.01)

(52) U.S. Cl.
CPC ............ *G02B 6/4401* (2013.01); *G02B 6/4479* (2013.01)

(58) Field of Classification Search
CPC ...... G02B 6/4494; G02B 6/443; G02B 6/441; G02B 6/4429; G02B 6/4495; G02B 6/4401; G02B 6/4479
USPC .......................... 385/109; 156/172; 427/163.2
See application file for complete search history.

(56) References Cited

U.S. PATENT DOCUMENTS

| | | | |
|---|---|---|---|
| 4,838,643 A | 6/1989 | Hodges et al. | |
| 5,348,586 A * | 9/1994 | Temple et al. | 118/405 |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,072,924 A * | 6/2000 | Sato et al. | 385/18 |
| 6,085,009 A | 7/2000 | Risch et al. | |
| 6,134,363 A | 10/2000 | Hinson et al. | |
| 6,167,225 A * | 12/2000 | Sasaki et al. | 430/118.2 |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,256,439 B1 | 7/2001 | Brown et al. | |
| 6,271,330 B1 | 8/2001 | Letchford et al. | |
| 6,314,224 B1 | 11/2001 | Stevens et al. | |
| 6,317,543 B1 | 11/2001 | Sheu | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,483,971 B2 * | 11/2002 | Gaillard et al. | 385/113 |
| 6,493,491 B1 | 12/2002 | Shen et al. | |

(Continued)

FOREIGN PATENT DOCUMENTS

| | | |
|---|---|---|
| EP | 1921478 A1 | 5/2008 |
| WO | 2007/149477 A2 | 12/2007 |
| WO | 2009/062131 A1 | 5/2009 |

OTHER PUBLICATIONS

Bluestar Silicones Technical Data Sheet for Bluesil FLD 47 V 50 to 47 V 1000, No. 112523, Jul. 2011, pp. 1-3.

(Continued)

*Primary Examiner* — Peter Radkowski
(74) *Attorney, Agent, or Firm* — Additon, Higgins & Pendleton, P.A.

(57) ABSTRACT

A method for manufacturing an optical-fiber buffer tube uses a prewetting agent possessing excellent surface affinity, wetting, and interfacial adhesion with optical-fiber coatings. The prewetting agent does not pool within or leak from the resulting buffer tubes during storage or vertical installation.

20 Claims, 1 Drawing Sheet

(56) References Cited

U.S. PATENT DOCUMENTS

| | | | |
|---|---|---|---|
| 6,579,914 B1 * | 6/2003 | Gantt et al. | 522/92 |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,749,446 B2 | 6/2004 | Nechitailo | |
| 6,845,200 B1 | 1/2005 | Quinn | |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,162,128 B2 | 1/2007 | Lovie et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,373,057 B2 | 5/2008 | Pizzorno et al. | |
| 7,483,613 B2 | 1/2009 | Bigot-Astruc et al. | |
| 7,515,795 B2 | 4/2009 | Overton et al. | |
| 7,526,177 B2 | 4/2009 | Matthijsse et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,574,095 B2 | 8/2009 | Lock et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,630,605 B2 | 12/2009 | Bringuier et al. | |
| 7,639,915 B2 | 12/2009 | Parris et al. | |
| 7,646,952 B2 | 1/2010 | Parris | |
| 7,646,954 B2 | 1/2010 | Tatat | |
| 7,665,902 B2 | 2/2010 | Griffioen et al. | |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 7,889,960 B2 | 2/2011 | de Montmorillon et al. | |
| 7,916,989 B2 | 3/2011 | Bringuier et al. | |
| 7,970,247 B2 | 6/2011 | Barker | |
| 7,974,507 B2 | 7/2011 | Lovie et al. | |
| 7,983,520 B2 | 7/2011 | Bringuier et al. | |
| 7,995,888 B2 | 8/2011 | Gholami et al. | |
| 8,009,950 B2 | 8/2011 | Molin et al. | |
| 8,031,997 B2 | 10/2011 | Overton | |
| 8,041,167 B2 | 10/2011 | Overton | |
| 8,041,168 B2 | 10/2011 | Overton | |
| 8,041,172 B2 | 10/2011 | Sillard et al. | |
| 8,055,111 B2 | 11/2011 | Sillard et al. | |
| 8,081,853 B2 | 12/2011 | Overton | |
| 8,145,025 B2 | 3/2012 | de Montmorillon et al. | |
| 8,145,026 B2 | 3/2012 | Overton et al. | |
| 8,145,027 B2 | 3/2012 | Overton et al. | |
| 8,165,439 B2 | 4/2012 | Overton | |
| 8,195,018 B2 | 6/2012 | Overton et al. | |
| 8,259,389 B2 | 9/2012 | Pastouret et al. | |
| 8,265,442 B2 | 9/2012 | Overton | |
| 8,274,647 B2 | 9/2012 | Gholami et al. | |
| 8,280,213 B2 | 10/2012 | Molin et al. | |
| 8,290,324 B2 | 10/2012 | Sillard et al. | |
| 8,301,000 B2 | 10/2012 | Sillard et al. | |
| 8,306,380 B2 | 11/2012 | Leatherman et al. | |
| 8,314,408 B2 | 11/2012 | Hartsuiker et al. | |
| 8,340,488 B2 | 12/2012 | Molin et al. | |
| 8,346,040 B2 | 1/2013 | Testu et al. | |
| 8,385,705 B2 | 2/2013 | Overton et al. | |
| 8,391,661 B2 | 3/2013 | Molin et al. | |
| 8,401,353 B2 | 3/2013 | Barker et al. | |
| 8,406,593 B2 | 3/2013 | Molin et al. | |
| 8,625,944 B1 * | 1/2014 | Parris et al. | 385/109 |
| 8,625,945 B1 * | 1/2014 | Parris et al. | 385/109 |
| 2002/0034367 A1 * | 3/2002 | Gaillard et al. | 385/113 |
| 2003/0045599 A1 * | 3/2003 | Khudyakov et al. | 522/96 |
| 2003/0045601 A1 * | 3/2003 | Purvis et al. | 522/173 |
| 2004/0063812 A1 * | 4/2004 | Sohal | 523/200 |
| 2005/0286843 A1 * | 12/2005 | Dallas et al. | 385/109 |
| 2008/0292262 A1 | 11/2008 | Overton et al. | |
| 2009/0214167 A1 | 8/2009 | Lookadoo et al. | |
| 2009/0297107 A1 | 12/2009 | Tatat | |
| 2010/0021170 A1 | 1/2010 | Lumineau et al. | |
| 2010/0119202 A1 | 5/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 * | 6/2010 | Testu et al. | 385/109 |
| 2010/0154479 A1 | 6/2010 | Milicevic et al. | |
| 2010/0166375 A1 | 7/2010 | Parris | |
| 2010/0189397 A1 | 7/2010 | Richard et al. | |
| 2010/0202741 A1 | 8/2010 | Ryan et al. | |
| 2010/0214649 A1 | 8/2010 | Burov et al. | |
| 2010/0215328 A1 * | 8/2010 | Tatat et al. | 385/113 |
| 2010/0310218 A1 | 12/2010 | Molin et al. | |
| 2011/0021699 A1 * | 1/2011 | Pritschins et al. | 524/875 |
| 2011/0026889 A1 | 2/2011 | Risch et al. | |
| 2011/0058781 A1 | 3/2011 | Molin et al. | |
| 2011/0069724 A1 | 3/2011 | Richard et al. | |
| 2011/0069932 A1 | 3/2011 | Overton et al. | |
| 2011/0085772 A1 * | 4/2011 | Benjamin et al. | 385/128 |
| 2011/0091171 A1 | 4/2011 | Tatat et al. | |
| 2011/0116160 A1 | 5/2011 | Boivin et al. | |
| 2011/0123161 A1 | 5/2011 | Molin et al. | |
| 2011/0123162 A1 | 5/2011 | Molin et al. | |
| 2011/0135263 A1 | 6/2011 | Molin et al. | |
| 2011/0135816 A1 | 6/2011 | Burns et al. | |
| 2011/0176782 A1 | 7/2011 | Parris | |
| 2011/0188821 A1 | 8/2011 | Bringuier et al. | |
| 2011/0188823 A1 | 8/2011 | Sillard et al. | |
| 2011/0188826 A1 | 8/2011 | Sillard et al. | |
| 2011/0217012 A1 | 9/2011 | Bigot-Astruc et al. | |
| 2011/0229101 A1 | 9/2011 | de Montmorillon et al. | |
| 2011/0268398 A1 | 11/2011 | Quinn et al. | |
| 2011/0268400 A1 | 11/2011 | Lovie et al. | |
| 2011/0287195 A1 | 11/2011 | Molin | |
| 2012/0009358 A1 | 1/2012 | Gharbi et al. | |
| 2012/0014652 A1 | 1/2012 | Parris | |
| 2012/0040105 A1 | 2/2012 | Overton | |
| 2012/0040184 A1 | 2/2012 | de Montmorillon et al. | |
| 2012/0051703 A1 | 3/2012 | Bigot-Astruc et al. | |
| 2012/0057833 A1 * | 3/2012 | Tatat | 385/111 |
| 2012/0092651 A1 | 4/2012 | Molin et al. | |
| 2012/0134376 A1 | 5/2012 | Burov et al. | |
| 2012/0148206 A1 | 6/2012 | Boivin et al. | |
| 2012/0195549 A1 | 8/2012 | Molin et al. | |
| 2012/0213483 A1 | 8/2012 | Risch et al. | |
| 2012/0224254 A1 | 9/2012 | Burov et al. | |
| 2012/0243843 A1 | 9/2012 | Molin et al. | |
| 2012/0251062 A1 | 10/2012 | Molin et al. | |
| 2012/0275751 A1 | 11/2012 | Krabshuis et al. | |
| 2012/0301093 A1 | 11/2012 | Sillard et al. | |
| 2012/0315006 A1 | 12/2012 | Bigot-Astruc et al. | |
| 2013/0004135 A1 | 1/2013 | Bigot-Astruc et al. | |
| 2013/0028564 A1 | 1/2013 | Molin et al. | |
| 2013/0167593 A1 | 7/2013 | Milicevic et al. | |
| 2013/0175437 A1 | 7/2013 | Burov et al. | |
| 2013/0209044 A1 | 8/2013 | Lowell et al. | |

OTHER PUBLICATIONS

Goulston Technologies, Safety Data Sheet for Lurol 13754, Monroe, NC, Dec. 2, 2010, pp. 1-4.

Goulston Technologies, Technical data report for Lurol 13754, Monroe, NC, Oct. 8, 2012, pp. 1.

Momentive, Datasheet for SF96 50, downloaded from http://www.gesilicones.com/siliconesweb/am1/en/documents/datasheets/2188.html, Aug. 29, 2008, pp. 1-8.

* cited by examiner

METHOD FOR MANUFACTURING AN OPTICAL-FIBER BUFFER TUBE

FIELD OF THE INVENTION

The present invention relates to the use of a prewetting agent during the manufacture of optical-fiber buffer tubes.

BACKGROUND

As compared with traditional wire-based networks, optical fiber communication networks are capable of transmitting significantly more information at significantly higher speeds. Optical fibers, therefore, are being increasingly employed in communication networks.

To expand total transmission throughput, optical fiber network providers are attempting to place ever more optical fibers in ever-smaller spaces. Packing fibers into tight spaces, however, can cause undesirable attenuation. Indeed, there is an inherent trade-off between increased fiber density and signal attenuation.

Reduced-size cables, which are often desirable for certain installations (e.g., where space is limited), are requiring ever-smaller buffer tubes. As buffer tubes become increasingly small, however, excess fiber length (EFL) becomes a significant problem. As will be known by those having ordinary skill in the art, EFL can occur as a result of buffer-tube shrinkage during processing and thereafter as post-extrusion shrinkage (PES). This can lead to undesirable attenuation. In this regard, it is believed that smaller buffer tubes shrink more than larger buffer tubes under the same conditions.

Buffer-tube designs having somewhat higher optical fiber densities have been achieved for the deployment of standard single-mode fibers (SSMFs). For example, as many as twelve discrete, conventional optical fibers (e.g., SSMFs having a diameter of about 245-255 microns) have been deployed in loose buffer tubes with an outer diameter larger than 2.5 millimeters and an inner diameter larger than 1.6 millimeters. For SSMFs, however, as the buffer-tube filling coefficient approaches 0.3, attenuation becomes problematic, particularly at extreme temperatures (e.g., −40° C. or 70° C.). This is especially so with respect to mid-span storage performance, such as deployments in which SSMFs are positioned in pedestals, cabinets, or other optical-fiber enclosures. By way of example, loose-tube cables must be accessible multiple times along its installed length at various positions, typically at such optical-fiber enclosures.

By way of illustration, after installation in a duct, an optical-fiber cable typically experiences temperature cycles. These temperature cycles can lead to signal attenuation. Indeed, significant changes in temperature can lead to post-extrusion shrinkage and increases in excess fiber length (EFL), which may contribute to signal attenuation. Thus, a loose buffer tube that is less susceptible to post-extrusion shrinkage is more suitable for mid-span storage. It is generally accepted that cables containing buffer tubes having a lower buffer-tube filling coefficient are less susceptible to attenuation when subjected to temperature cycles and thus are more suitable for mid-span storage.

Reducing the wall thickness of a buffer tube while maintaining its outer diameter necessarily increases its inner diameter and thus the cross-sectional area available for deploying optical fibers. For many optical fiber applications, reducing buffer-tube wall thickness is unsatisfactory because such buffer tubes provide insufficient crush resistance (i.e., hoop strength). For many rigorous applications, buffer tubes must be capable of handling loads during installation and use in a way that satisfies customer expectations.

In addition, optical-fiber buffer tubes and fiber optic cables are susceptible to water intrusion. Water-blocking in buffer tubes and fiber optic cables typically has been accomplished by using petroleum-based filling compounds (e.g., grease or grease-like gels). By completely filling all of the free space inside a buffer tube that contains an optical fiber or optical-fiber bundle, the filling compound blocks the ingress of water into the fiber optic cable.

Moreover, being a thixotropic material, the filling compound also tends to mechanically couple the optical fibers to the buffer tube. Such mechanical coupling prevents the optical fibers from retracting inside the buffer tube as the buffer tube is processed during manufacturing, as the cable is installed or otherwise handled in the field, or as the cable is subjected to thermally induced dimensional changes from environmental exposure.

Although relatively effective for controlling buffer-tube and cable water-blocking, the petroleum-based filling compounds are inconvenient during cable access, cable repair, and optical-fiber splicing. The use of such filling compound requires cleaning the petroleum-based material from optical fibers prior to splicing (and sometimes from equipment and personnel, too). This can be messy and time consuming. Consequently, using conventional filling greases is often undesirable.

Various dry-cable designs have been developed to eliminate filling greases while providing some water-blocking and coupling functionality. In either loose-tube optical-fiber cables or ribbon cables, a totally dry design eliminates the filling compound from the enclosed buffer tubes. In a dry-cable design, for example, filling compound may be replaced by a water-blocking element, such as a tape or a yarn carrying a water-swellable material (e.g., water-swellable powder). Water-swellable powders are dry to the touch and, when bound to a carrier tape or yarn, can be readily removed during field operations (e.g., splicing).

A substantial problem with dry-cable designs is that the optical fibers can build up a charge of static electricity during processing. Static electricity may cause the optical fibers located within the buffer tube to repel one another. If the optical fibers are repelled from one another during buffer tube extrusion, they will be forced into and likely stick to the molten buffer tube wall. This sticking can result in elevated optical fiber attenuation. This static electricity may also persist until a buffer tube is opened for the purpose of accessing the optical fibers. A static charge is undesirable, because it may increase the difficulty of capturing optical fibers for splicing, connecting, or ribbonizing.

Another substantial problem with dry-cable designs is that after the formation of the extruded buffer tube around optical fibers, the optical fibers tend to stick to the inner surface of the solidified buffer tube. This stiction (i.e., the static friction between the optical fibers and the surrounding buffer tube) can result in increased and/or highly variable excess fiber length (EFL) during manufacturing. The stiction phenomenon can be the result of a static electricity, as well as simple contact and surface forces between an optical fiber and the surrounding buffer tube.

Proposed solutions to these respective problems of static electricity and buffer-tube sticking have been unsatisfactory. For instance, in gel-free buffer-tube designs that include a lubricant to reduce static and stiction, flow and leakage of the lubricant from the buffer tubes may occur during cable storage and installation.

SUMMARY

Accordingly, in one aspect, the invention embraces the use of an optical-fiber prewetting agent that, with respect to optical fibers, (i) reduces static electricity, (ii) reduces sticking (e.g., stiction), and (iii) possesses excellent surface affinity, wetting, and/or interfacial adhesion with optical-fiber coatings. As a practical matter, the prewetting agent's improved interfacial adhesion with optical-fiber coatings means that the prewetting agent does not flow from buffer tubes during storage or installation, particularly when the buffer tubes are installed vertically. The present prewetting agent can completely wet and spontaneously spread upon an optical-fiber coating (e.g., a urethane-acrylic optical-fiber coating).

In another aspect, the invention embraces a gel-free, loose buffer tube that includes one or more optical fibers that have been treated with a functionalized silicone prewetting agent that not only reduces static electricity and stiction, but also possesses excellent surface affinity, wetting, and/or interfacial adhesion with optical-fiber coatings. At standard temperature and pressure of 20° C. and 1 atmosphere, the functionalized silicone prewetting agent typically has an interfacial adhesion of more than 2.35 dynes/cm$^2$ (2.40 mgf/cm$^2$) (e.g., about 2.4 dynes/cm$^2$ (2.45 mgf/cm$^2$)), such as more than about 2.55 dynes/cm$^2$ (2.60 mgf/cm$^2$) (e.g., about 2.6 dynes/cm$^2$ (2.65 mgf/cm$^2$)), with the material that forms the outermost coating of the optical fibers (e.g., a urethane-acrylate composition). The interfacial adhesion may be determined at 20° C. in situ on an optical fiber or via mass of fluid suspended on secondary-coating film.

In one exemplary embodiment, this loose buffer tube includes discrete, prewet optical fibers positioned within a polymeric tube. The buffer tube, which is substantially free of thixotropic compositions, has a reduced-diameter, typically possessing a buffer-tube filling coefficient of about 0.30 or higher (e.g., 0.35-0.50).

In another exemplary embodiment, upon subjecting this loose buffer tube to the mid-span testing according to the GR-20-CORE mid-span standard, the optical fibers possess an average change in optical-fiber attenuation of no more than 0.15 dB at a wavelength of 1550 nanometers.

In another exemplary embodiment, upon subjecting this loose buffer tube to the mid-span testing according to the USDA Rural Electrification Administration mid-span standard, (i) each of the optical fibers enclosed within the buffer tube has increased attenuation of no more than about 0.1 dB and (ii) the optical fibers enclosed within the buffer tube have a mean increased attenuation of no more than about 0.05 dB.

In yet another exemplary embodiment, upon subjecting the loose buffer tube to the mid-span testing according to the modified USDA Rural Electrification Administration mid-span standard, the optical fibers possess an average change in optical-fiber attenuation of no more than about 0.15 dB at a wavelength of 1550 nanometers (e.g., 0.10 dB).

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
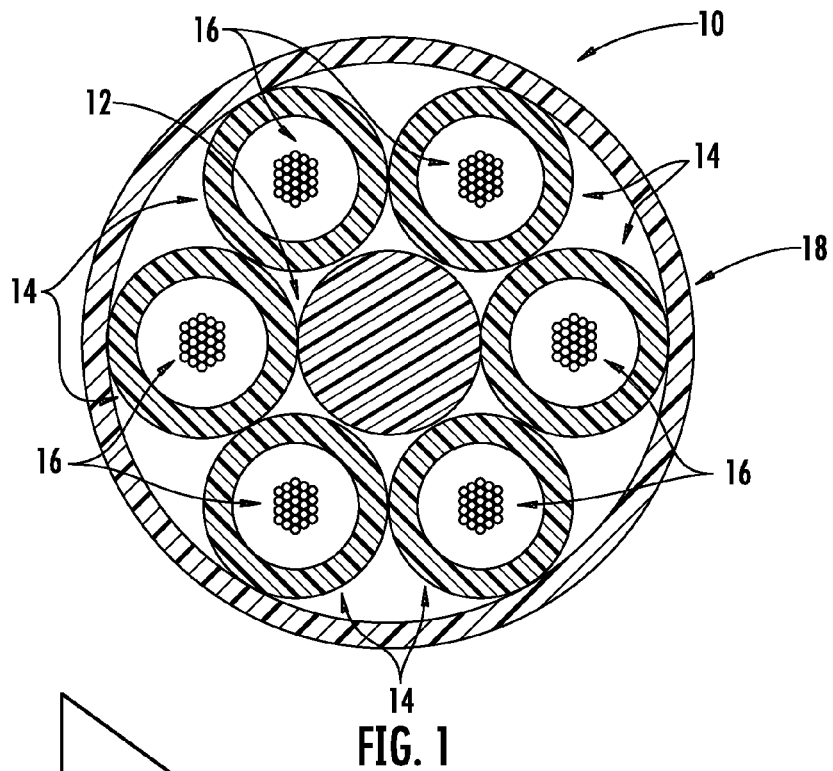
FIG. 1 schematically depicts a cross-sectional view of an exemplary embodiment of an optical-fiber cable employing buffer tubes according to the present invention.

The present invention relates to the application of a prewetting agent during the manufacture of dry optical-fiber buffer tubes, such as a polymeric sheath enclosing one or more loose optical fibers. The application (e.g., wetting and adhering) of the prewetting agent to an optical fiber (i.e., the optical fiber's outermost coating) interferes with the adhesion and stiction between the optical fiber and the buffer tube's surrounding polymeric sheath (i.e., the polymeric tube).

During an exemplary buffering operation according to the present invention, a prewetting agent, such as a functionalized silicone, is first applied to one or more optical fibers (e.g., using a wiping die to apply a thin layer of prewetting agent onto a bundle of optical fibers). For example, a thin layer of functionalized-silicone prewetting agent may be applied to the optical fibers in a twelve-fiber buffer tube at about 3 to 20 grams per fiber per kilometer of buffer tube, such as 10 grams per fiber per kilometer of buffer tube (e.g., 120 grams of prewetting agent for every kilometer of a twelve-fiber buffer tube). A molten polymeric sheath is then extruded around the prewet optical fibers to form a loose buffer tube. After its extrusion, the molten polymeric sheath is typically submerged in a water-filled cooling vat that quickly solidifies the polymeric sheath, thereby forming a buffer tube.

For the sake of clarity and consistency, the term "buffer tube" as used herein with respect to the present invention generally refers to the combination of the optical fiber(s) and the surrounding polymeric sheath. As disclosed herein, the resulting buffer tube may include single-mode optical fibers and/or multimode optical fibers. The buffer tube's polymeric sheath may be formed, for example, from a polyolefin (e.g., nucleated or non-nucleated polyethylene, nucleated polypropylene, or a copolymer or blend thereof), polyester (e.g., polybutylene terephthalate), a polyamide (e.g., nylon), or a flame retardant composition, such as a low-smoke, zero-halogen (LSZH) compound, a flame retardant polyvinyl chloride (PVC), or a polyvinylidene difluoride (PVDF) copolymer.

During this aforementioned buffering operation, the prewet optical fibers might be surrounded by a water-blocking element, such as a yarn or tape carrying a water-swellable material (e.g., water-swellable powder). For instance, one or more water-swellable yarns (e.g., a thread-sized water-blocking element) may be helically wrapped around a bundle of optical fibers before the polymeric sheath is extruded around the optical fibers.

As is known by those having ordinary skill in the art, optical fibers include the component glass fiber itself (i.e., the glass core and surrounding cladding layers) and one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings, in which case the tertiary ink layer is considered to be the outermost optical-fiber coating layer.

The respective coating layers typically possess a urethane-acrylate chemistry. For example, after curing, an exemplary urethane-acrylate primary coating might possess (i) an in situ modulus of less than about 0.65 MPa (e.g., less than 0.5 MPa, such as between about 0.2 MPa and 0.4 MPa) and (ii) a glass transition temperature of less than about −50° C., and an exemplary urethane-acrylate secondary coating might possess a modulus of between about 800 MPa and 1,000 MPa (e.g., about 900 MPa). Exemplary optical-fiber coatings are disclosed in commonly assigned U.S. Pat. No. 8,265,442 for a Microbend-Resistant Optical Fiber (Overton) and/or commonly assigned U.S. Patent Application Publication No. 2010/0119202 A1 for a Reduced-Diameter Optical Fiber (Overton), each of which is incorporated by reference in its entirety.

As will be understood by those having ordinary skill in the art, the term "stiction" generally refers to the force required to cause one stationary body to move when in contact with another stationary body. In other words, stiction relates to resistance of movement when dealing with very small, stationary bodies, such as a size exemplified by the width of an optical fiber. With respect to the present invention, the concept of stiction pertains to the tendency of optical fibers to maintain contact with a surrounding polymeric sheath. During a typical buffering operation, there is little relative movement between the optical fibers and the surrounding, molten polymer sheath. As such, stiction is problematic.

Without being bound to any theory, the use of an improved prewetting agent (e.g., a functionalized silicone) provides increased interfacial adhesion between the prewetting agent and the optical fiber's outermost coating (e.g., a secondary coating or, if present, an ink layer). It has been discovered that use of a functionalized silicone (e.g., chemically modified polydimethylsiloxane) provides significantly improved interfacial interaction with optical-fiber coatings. It is this interfacial adhesion that retains the prewetting agent on the optical fiber during buffer-tube manufacture, storage, and installation. Thus, selective application of the wetting agent achieves higher interfacial adhesion between the wetting agent and an optical fiber while maintaining or even reducing stiction between the optical fiber and the surrounding polymeric sheath (e.g., during manufacturing, storage, and/or installation).

By way of example, as compared with baseline interfacial adhesion between an exemplary urethane-acrylate secondary coating and unmodified polydimethylsiloxane (CAS No. 63148-62-9) having viscosity of about 50 mPa·s, a functionalized silicone having viscosity of about 75 mPa·s increases interfacial adhesion by at least about 10 percent, more typically by at least about 20 percent (e.g., about 25 percent to about 50 percent or more) at standard temperature and pressure (STP) (e.g., 20° C. and 1 atmosphere). Without being bound to any theory, it is thought that a prewetting agent with modified constituent chemical groups possesses greater interfacial affinity for urethane-acrylate, optical-fiber coatings through specific secondary and/or primary chemical interactions (i.e., dispersion forces, dipole-dipole interactions, hydrogen bonding, and/or covalent bonding).

With respect to the present invention, functionalized silicone refers to a silicone fluid that has been chemically modified to differ from unmodified polydimethylsiloxane fluid (PDMS) (CAS No. 63148-62-9). In this regard, polydimethylsiloxane is typically modified with functional groups including alkyl, polyglycol, polyether, amino, halogenated groups, or other such functional groups, to modify affinity, wetting, and interfacial-adhesion properties (e.g., with respect to optical-fiber coatings). That said, it is within the scope of the present invention to use a polydimethylsiloxane having a modified polymeric chain backbone.

Exemplary functionalized silicones are disclosed in U.S. Pat. No. 6,271,330, which is hereby incorporated by reference in its entirety. One particular chemically modified polydimethylsiloxane is Lurol 13754, a textile-yarn spin finish that is available from Goulston Technologies, Inc. (Monroe, N.C.).

Conventional lubricants (e.g., oils) possessing suitable viscosity will flow out of buffer tubes if the buffer tubes (e.g., as incorporated into a cable) are positioned in a vertical orientation. Likewise, conventional lubricants can pool in buffer tubes when the buffer tubes are stored on a reel (e.g., a wound cable that includes a plurality of loose buffer tubes).

Those having ordinary skill in the art will appreciate that increasing fluid viscosity can slow but not prevent the flow of lubricant (i.e., viscosity pertains to the relationship between force and the rate of flow). High viscosity tends to retard wetting and spreading. Thickening agents (i.e., thickeners) are conventionally added to buffer-tube gels in order to achieve a yield stress that retards the flow of filling gel. The addition of thickening agents, however, makes impractical the application of a very thin layer of lubricant to the optical fibers (e.g., achieving a lubricant coating of less than about 50 microns, such as about 20 microns (e.g., 10-15 microns, such as about 12 microns). Moreover, the addition of thickening agents typically increases stiction, adhesive, and viscous coupling between the optical fibers and buffer tube. When such thickening agents (e.g., grease or grease-like gels) are not being used to completely fill the free space within the buffer tube, increased and highly variable excess fiber length can occur.

In accordance with the foregoing, exemplary functionalized-silicone prewetting agents are free from agents, such as silica (e.g., fumed silica) and alumina (e.g., fumed alumina), or other additives (e.g., copolymers, such as block polymers) that modify viscosity or reduce contact angle and/or surface tension. For example, an additive-free, chemically modified polydimethylsiloxane reflects the incorporation of functional groups, but its polymeric backbone chemistry is typically unmodified.

To compare the performance of an exemplary functionalized silicone with improved interfacial adhesion against a standard silicone, several twelve-fiber, 2.5-millimeter (OD) buffer tubes were manufactured in accordance with the foregoing buffering description. The outermost coating for the optical fibers (i.e., a colored secondary coating) was a urethane-acrylate-based composition. The amounts of prewetting agent and lubricant were controlled using a wiping die. After manufacture, ten-foot sections of buffer tube, which are representative of the typical cable circumference on a cabling reel, were suspended vertically and the fluid leakage was measured over seven days.

Table 1 (below) compares the drip-testing performance of an exemplary functionalized silicone prewetting agent, namely a functionalized polydimethylsiloxane having a viscosity of about 75 mPa·s against an unmodified polydimethylsiloxane (PDMS) having a viscosity of about 50 mPa·s (CAS No. 63148-62-9).

TABLE 1

| trial | composition | hydrostatic application pressure (Pa) | three-day drip (grams) | seven-day drip (grams) |
|---|---|---|---|---|
| 1A | prewetting agent | 480 | 0 | 0 |
| 1B | prewetting agent | 480 | 0 | 0 |
| 2A | prewetting agent | 360 | 0 | 0 |

TABLE 1-continued

| trial | composition | hydrostatic application pressure (Pa) | three-day drip (grams) | seven-day drip (grams) |
|---|---|---|---|---|
| 2B | prewetting agent | 360 | 0 | 0 |
| 3A | unmodified PDMS | 360 | 0.604 | 1.882 |
| 3B | unmodified PDMS | 360 | 0.662 | 1.963 |
| 4A | unmodified PDMS | 480 | 0.708 | 2.198 |
| 4B | unmodified PDMS | 480 | 0.500 | 1.766 |

In brief, whereas significant leakage was observed from the buffer tubes manufactured using unmodified polydimethylsiloxane (PDMS), no drippage whatsoever was measured or otherwise observed from any of the buffer tubes manufactured using the functionalized silicone prewetting agent. Indeed, based on the amount of prewetting agent and lubricant in the ten-foot sections of buffer tube (~4.32 grams) and the respective losses, it would seem that that the complete retention of functionalized silicone prewetting agent (~4.32 grams) was over 80 percent higher than the average retention of the unmodified polydimethylsiloxane (PDMS) (~2.37 grams).

Moreover, the effect of viscosity on flow rate is illustrated in Table 1. No substantial flow of the unmodified polydimethylsiloxane (PDMS) was observed until after 24 hours, yet its flow continued over the course of the seven-day testing period.

In other testing, equivalent lengths of typical, individual optical fibers were immersed in (i) the chemically modified polydimethylsiloxane having a viscosity of about 75 mPa·s and (ii) the unmodified polydimethylsiloxane (PDMS) having a viscosity of about 50 mPa·s (CAS No. 63148-62-9). At equilibrium (i.e., cessation of dripping), the optical fibers having an urethane-acrylate outermost coating suspended an average of about 21 milligrams per meter of the chemically modified polydimethylsiloxane but only an average of about 14 milligrams per meter of the unmodified polydimethylsiloxane (PDMS). In other words, at equilibrium, the functionalized silicone was retained on average about 50 percent more than the unmodified polydimethylsiloxane.

More generally, the present invention embraces the use of a functionalized silicone prewetting agent that, as compared with unmodified polydimethylsiloxane (PDMS), increases by at least 20 percent (e.g., 30 percent to 80 percent or more) the mass of fluid that can be suspended on a given length of optical fiber. This difference in suspension capability between the respective fluids correlates well to measured interfacial adhesion values and would account for the difference in interfacial adhesion necessary to preclude leakage of the prewetting agent, as was observed in the experiment described in Table 1.

In addition, the respective interfacial adhesion forces with respect to a urethane-acrylate secondary-coating film were determined for (i) the chemically modified polydimethylsiloxane having a viscosity of about 75 mPa·s and (ii) the unmodified polydimethylsiloxane (PDMS) having a viscosity of about 50 mPa·s (CAS No. 63148-62-9). In other words, an exemplary urethane-acrylate, optical-fiber secondary coating was formed into a film, and the respective interfacial adhesion was determined at 20° C. for the exemplary functionalized silicone prewetting agent and the unmodified polydimethylsiloxane on a freshly prepared and substantially cured film (e.g., at least about 90 percent cured).

In summary, with respect to a urethane-acrylate secondary-coating film and at standard temperature and pressure (STP) (e.g., 20° C. and 1 atmosphere), the functionalized-silicone prewetting agent having a viscosity of about 75 mPa·s exhibited an interfacial adhesion of 2.76 dynes/cm$^2$ (2.82 mgf/cm$^2$), and the unmodified polydimethylsiloxane having a viscosity of about 50 mPa·s exhibited an interfacial adhesion of 2.35 dynes/cm$^2$ (2.40 mgf/cm$^2$). As compared with unmodified polydimethylsiloxane (PDMS), the exemplary functionalized silicone prewetting agent demonstrated increased chemical affinity for the exemplary urethane-acrylate, optical-fiber secondary coating, exhibiting a 17.4-percent interfacial-adhesion improvement. With respect to the present invention, this characterizes the prewetting agent's excellent resistance to flow initiation (i.e., reduced leakage).

Similarly, the respective in situ interfacial adhesion forces with respect to an outermost, urethane-acrylate optical-fiber coating were determined for (i) the chemically modified polydimethylsiloxane having a viscosity of about 75 mPa·s and (ii) the unmodified polydimethylsiloxane (PDMS) having a viscosity of about 50 mPa·s (CAS No. 63148-62-9). With respect to an optical fiber coated with a urethane-acrylate secondary coating and at standard temperature and pressure (STP) (e.g., 20° C. and 1 atmosphere), the functionalized-silicone prewetting agent having a viscosity of about 75 mPa·s exhibited an interfacial adhesion of 2.74 dynes/cm2 (2.79 mgf/cm$^2$), and the unmodified polydimethylsiloxane having a viscosity of about 50 mPa·s exhibited an interfacial adhesion of 1.79 dynes/cm$^2$ (1.82 mgf/cm$^2$). As compared with unmodified polydimethylsiloxane (PDMS), the exemplary functionalized silicone prewetting agent demonstrated increased chemical affinity for the exemplary urethane-acrylate secondary coating, exhibiting over a 50-percent interfacial-adhesion improvement.

As noted, viscosity pertains to the relationship between force and the rate of flow, so simply increasing the viscosity of the lubricant merely slows the rate of lubricant leakage from the buffer tubes. As such, the differences in viscosity do not explain the differences in measured interfacial adhesion. Moreover, modifying a conventional lubricant with a thickener to impart yield stress can cause undesirable lubricant attributes, such as increased viscosity, higher application thickness, increased frictional-coupling forces between the coated optical fibers and the buffer tube, and increased cleaning requirements during cable installation and splicing. In this regard, higher viscosity tends to interfere with the ability of the lubricant to perform during manufacturing and installation.

In accordance with the foregoing, the present invention embraces a method for manufacturing an optical-fiber buffer tube. The method includes applying a prewetting agent to one or more optical fibers (e.g., twelve or twenty four optical fibers). Every optical fiber includes a glass fiber and an outermost optical-fiber coating surrounding the glass fiber. Thereafter, a polymeric sheath is formed around the one or more optical fibers. The present invention also embraces the resulting optical-fiber buffer tube.

Exemplary prewetting agents typically have an interfacial adhesion of at least about 2.40 dynes/cm$^2$ (2.45 mgf/cm$^2$), such as between about 2.45 dynes/cm$^2$ (2.5 mgf/cm$^2$) and 2.9 dynes/cm$^2$ (2.95 mgf/cm$^2$) (e.g., between about 2.5 dynes/cm$^2$ (2.55 mgf/cm$^2$) and 2.75 dynes/cm$^2$ (2.8 mgf/cm$^2$)), with respect to the optical fibers' outermost coating (e.g., a urethane-acrylate optical-fiber coating or, if present, a urethane-acrylate ink layer). In this regard, the interfacial adhesion is defined as the mass of a film of fluid that can be supported per unit of square area by adhesive forces between the fluid and the surface. As will be understood by those having ordinary skill in the art, such interfacial adhesion can be measured at standard temperature and pressure of 20° C. and 1 atmosphere in situ on an optical fiber or via mass of fluid suspended on secondary coating film. In addition, exemplary prewetting agents typically have viscosities between 5 mPa·s and 500 mPa·s, particularly between about 10 mPa·s and 100 mPa·s (e.g., between about 40 mPa·s and 90 mPa·s, such as about 50 mPa·s or 75 mPa·s).

As noted, an exemplary polymer sheath enclosing the optical fibers may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a polymeric sheath may be formed of one or more layers. The layers may be homogeneous or include mixtures or blends of various materials within each layer. The polymeric sheath may be extruded (e.g., an extruded polymeric material). By way of example, the polymeric sheath may include a material to provide high temperature and chemical resistance (e.g., an aromatic material or polysulfone material).

In one embodiment, the buffer tube's polymeric sheath may be formed from nucleated polypropylene. Polymeric sheaths formed from nucleated polypropylene are described, for example, in U.S. Pat. Nos. 5,574,816, 5,761,362, and 5,911,023, each of which is hereby incorporated by reference in its entirety. Those having ordinary skill in the art will appreciate that the use of nucleating agents helps to increase the Young's modulus for polypropylene. In this regard, nucleated polypropylene may have a Young's modulus of about 1,800 MPa.

As used herein, the term "buffer-tube filling coefficient" refers to the ratio of the total cross-sectional area of the fibers within a buffer tube versus the inner cross-sectional area of that buffer tube (i.e., defined by the inner boundary of the buffer tube). Optical-fiber cables that include the present buffer tubes have a relatively high buffer-tube filling coefficient.

Although buffer tubes typically have a circular cross section, buffer tubes alternatively may have an irregular or non-circular shape (e.g., an oval or a trapezoidal cross-section). To the extent that non-circular buffer tubes are used, the longest inner cross-sectional width of the buffer tube can be used to define the diameter of a theoretical circularized buffer tube cross-sectional area. As used herein, the term "circularized buffer-tube filling coefficient" refers to the ratio of the total cross-sectional area of the optical fibers enclosed within buffer tubes versus the sum of the theoretical circularized cross-sectional areas of the buffer tubes containing those optical fibers. A circularized buffer-tube filling coefficient is one convenient way to characterize the cross-sectional area of an irregularly shaped buffer tube. Those having ordinary skill in the art will appreciate that for all but circular buffer tubes, buffer-tube filling coefficient and circularized buffer-tube filling coefficient are unequal.

In view of the foregoing, optical-fiber buffer tubes according to the present invention have a filling coefficient (or circularized filling coefficient for buffer tubes having a non-circular cross section) of at least about 0.30. For example, the buffer tubes may have a filling coefficient of at least about 0.35. By way of further example, the buffer tubes may have a filling coefficient of at least about 0.40 (e.g., about 0.45 or more or about 0.49 or more). In accordance with the present invention, increasing the fiber density within loose buffer tubes (i.e., the buffer-tube filling coefficient) is achieved without causing undesirable attenuation or unwanted leakage of prewetting agent.

Prewet optical fibers may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

Dry, loose buffer tubes according to the present invention include one or more optical fibers (e.g., a bundle of twelve or more optical fibers). Optical fibers, which have been prewet with a prewetting agent (e.g., a functionalized silicone), may be positioned within a central annular space defined by the buffer tube (e.g., the polymeric tube).

As noted, the present dry buffer tubes are substantially free from thixotropic compositions (e.g., grease or grease-like gels). Those having ordinary skill in the art will appreciate that thixotropic filling greases are relatively heavy and messy, and can thus hinder connection and splicing operations. Consequently, the buffer tube typically includes a water-blocking element, such as a tape or a yarn carrying a water-swellable material (e.g., water-swellable powder), positioned within the buffer tube's polymeric sheath. In this case, the polymeric sheath surrounds the optical fibers and the water-swellable tape and/or coupling element. In one exemplary buffer-tube embodiment, a water-swellable yarn (e.g., a thread-sized water-blocking element) is helically wrapped around a plurality of prewet optical fibers within the polymeric tube's annular space. Alternatively, a water-swellable yarn (e.g., a thread-sized water-blocking element) may be positioned longitudinally (e.g., adjacent to the prewet optical fibers) within the within the polymeric tube's annular space.

The optical fibers employed in the loose buffer tubes according to the present invention are typically optical fibers possessing diameters (i.e., the combined diameter of the glass fiber and its coatings) of between about 235 microns and 265 microns (e.g., 242 microns). That said, it is within the scope of the invention to employ optical fibers having smaller diameters (e.g., about 200 microns).

In general, it is desirable to increase the filling of optical elements (e.g., optical fibers) in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

In one embodiment, the present buffer tube includes one or more multimode optical fibers (e.g., conventional multimode optical fibers with a 50-micron core, such as OM2 multimode optical fibers, that comply with the ITU-T G.651.1 recommendations). The ITU-T G.651.1 (July 2007) recommendations are hereby incorporated by reference in their entirety.

Exemplary multimode optical fibers that may be employed include MaxCap™ multimode optical fibers (OM2+, OM3, or OM4), which are commercially available from Draka (Claremont, N.C.).

Alternatively, the present buffer tube may include bend-insensitive multimode optical fibers, such as MaxCap™-BB-OMx multimode optical fibers, which are commercially available from Draka (Claremont, N.C.). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

In contrast, in accordance with the ITU-T G.651.1 recommendations, standard multimode optical fibers have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, such standard multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

Multimode optical fibers are advantageous, because their relatively large core diameter facilitates easy connectorization. Accordingly, it is within the scope of the present invention to employ multimode optical fibers having enlarged core diameters (e.g., 62.5 microns or greater), such as between about 70 microns and 100 microns (e.g., about 80 microns). An exemplary multimode optical fiber having an enlarged core diameter is disclosed in commonly assigned U.S. Patent Application Publication No. 2012/0243843 A1 for a Bend-Resistant Multimode Optical Fiber, (Molin et al.), which is hereby incorporated by reference in its entirety. In particular, U.S. Patent Application Publication No. 2012/0243843 A1 discloses a trench-assisted multimode optical fiber having improved bend resistance.

In another embodiment, the present buffer tube includes a plurality of standard single-mode optical fibers (SSMF). Suitable single-mode optical fibers (e.g., enhanced single-mode optical fibers (ESMF)) that are compliant with the ITU-T G.652.D recommendations are commercially available, for instance, from Draka (Claremont, N.C.). The ITU-T G.652 (November 2009) recommendations and each of its attributes (i.e., A, B, C, and D) are hereby incorporated by reference in their entirety.

In yet another embodiment, the present buffer tube includes a plurality of bend-insensitive single-mode optical fibers. Bend-insensitive single-mode optical fibers, which are less susceptible to attenuation (e.g., caused by microbending or macrobending), are commercially available from Draka (Claremont, N.C.) under the trade name BendBright®. BendBright® optical fibers are compliant with the ITU-T G.652.D recommendations. That said, it is within the scope of the present invention to employ a bend-insensitive glass fiber that meets the ITU-T G.657.A recommendations (e.g., the ITU-T G.657.A1 (November 2009) and the ITU-T G.657.A2 (November 2009) subcategories) and/or the ITU-T G.657.B recommendations (e.g., the ITU-T G.657.B2 (November 2009) and the ITU-T G.657.B3 (November 2009) subcategories). In this regard, the ITU-T G.657.A1 (November 2009) subcategory fully encompasses the former ITU-T G.657.A (December 2006) category, and the ITU-T G.657.B2 (November 2009) subcategory fully encompasses the former ITU-T G.657.B (December 2006) category. The ITU-T G.657.A/B recommendations are hereby incorporated by reference in their entirety.

In this regard, particularly outstanding bend-insensitive single-mode glass fibers for use in the present invention are commercially available from Draka (Claremont, N.C.) under the trade names BendBrightXS® and BendBright-Elite™ BendBrightXS® optical fibers and BendBright-Elite™ optical fibers are not only compliant with both the ITU-T G.652.D and ITU-T G.657.A/B recommendations, but also demonstrate significant improvement with respect to both macrobending and microbending. As compared with such bend-insensitive single-mode optical fibers, conventional single-mode optical fibers typically do not comply with either the ITU-T G.657.A recommendations or the ITU-T G.657.B recommendations, but do typically comply with the ITU-T G.652 recommendations (e.g., the ITU-T G.652.D recommendations).

Bend-insensitive optical fibers perform better (i.e., are less susceptible to attenuation) than standard optical fibers in the mid-span temperature-cycle test at high buffer-tube filling coefficients. Accordingly, bend-insensitive optical fibers facilitate a reduction in buffer-tube inner diameter and/or an increase in EFL tolerance.

As set forth in commonly assigned U.S. Pat. No. 8,265,442, U.S. Pat. No. 8,145,027, U.S. Pat. No. 8,385,705, and International Patent Application Publication No. WO 2009/062131 A1, pairing a bend-insensitive glass fiber (e.g., Draka's single-mode glass fibers available under the trade name BendBrightXS®) and a primary coating having very low modulus achieves optical fibers having exceptionally low losses (e.g., reductions in microbend sensitivity of at least 10× as compared with a single-mode optical fiber employing a conventional coating system). Each of these patent publications is hereby incorporated by reference in its entirety.

The optical fibers deployed in the present buffer tubes may employ the optical-fiber coatings disclosed in U.S. Pat. No. 8,265,442 with either single-mode optical fibers or multimode optical fibers.

An optical fiber with a primary coating (and an optional secondary coating and/or ink layer) typically has an outer diameter of between about 235 microns and about 265 microns ($\mu$m). The component glass fiber itself (i.e., the glass core and surrounding cladding layers) typically has a diameter of about 125 microns, such that the total coating thickness is typically between about 55 microns and 70 microns.

The component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, an optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

More generally, a reduced-diameter optical fiber is cost-effective, requiring less raw material. A reduced-diameter optical fiber requires less deployment space (e.g., within a buffer tube and/or fiber optic cable), thereby facilitating increased fiber count and/or reduced cable size.

In one embodiment, exemplary buffer tubes (e.g., loose buffer tubes) according to present invention have circular cross-sections and have an outer diameter of less than about 2.55 millimeters (e.g., an outer diameter of no more than about 2.4 millimeters), typically less than about 2.35 millimeters (e.g., less than about 2.2 millimeters, such as 2.1 millimeters or less). Such exemplary buffer tubes may also have an inner diameter of less than about 1.6 millimeters (e.g., no more than about 1.4 millimeters). By way of further example, exemplary buffer tubes may have an inner diameter of about 1.3 millimeters or less (e.g., about 1.2 millimeters or less). In this regard, exemplary buffer tubes having a substantially circular cross section may have a filling coefficient of between about 0.35 and 0.50. Moreover, exemplary buffer tubes having a non-circular cross section may possess a circularized filling coefficient of between about 0.30 and 0.45.

Table 2 (below) presents exemplary buffer tubes according to the present invention. As depicted, these exemplary buffer tubes contain twelve optical fibers having an outer diameter of about 242 microns and have a filling coefficient of at least about 0.32 (i.e., an optical fiber density of about 32 percent).

TABLE 2

(Buffer-Tube Filling Coefficient)

|  | Ex. 1 | Ex. 2 | Ex. 3 | Ex. 4 |
|---|---|---|---|---|
| Buffer Tube OD (mm) | 2.5 | 2.3 | 2.2 | 2.1 |
| Buffer Tubes ID (mm) | 1.6 | 1.4 | 1.3 | 1.2 |
| No. Optical Fibers | 12 | 12 | 12 | 12 |
| Optical Fiber OD (μm) | 242 | 242 | 242 | 242 |
| Buffer-Tube Filling Coefficient | 0.32 | 0.36 | 0.42 | 0.49 |

Those having ordinary skill in the art will appreciate that standard optical fibers are typically sensitive to bending (e.g., microbending or macrobending), which can lead to attenuation. Thus, to enable higher filling coefficients without causing unsatisfactory attenuation, the buffer tubes according to the present invention have reduced post-extrusion shrinkage (PES) and reduced excess fiber length (EFL).

In another embodiment, the reduced-diameter loose buffer tubes of the present invention employ conventional optical fibers that, at a wavelength of 1550 nanometers, have microbending sensitivity of more than 3.5 (dB/km)/(gf/mm), such as 4.0 (dB/km)/(gf/mm) or more, when measured by an expandable drum apparatus at a temperature between about −30° C. and 60° C. in accordance with U.S. Pat. No. 7,373,057 (Pizzorno). U.S. Pat. No. 7,373,057 is incorporated by reference in its entirety.

In yet another embodiment, the reduced-diameter loose buffer tubes of the present invention employ conventional optical fibers that, at 23° C. and a wavelength of 1550 nanometers, have microbending sensitivity (added loss) of more than 0.5 dB/km, typically more than 1.0 dB/km (e.g., 1.5 dB/km or more), when measured by a modified IEC fixed-diameter sandpaper drum test (i.e., IEC TR62221, Method B). This particular modified IEC fixed-diameter sandpaper drum test winds, at a controlled back tension of 150 gf, a 440-meter optical fiber sample onto a 300-mm diameter quartz cylinder that is wrapped with adhesive-backed, 320-grit sandpaper. Various modified and unmodified IEC TR62221 tests are disclosed in commonly assigned U.S. Pat. No. 8,265,442 for a Microbend-Resistant Optical Fiber (Overton).

The optical-fiber buffer tubes according to the present invention typically possess satisfactory hoop strength, meeting or exceeding conventional crush testing requirements.

Buffer-tube crush resistance may be tested with a sheave test. The purpose of a sheave test is to simulate a rigorous loading that may occur during normal cable installation. A sheave testing standard and procedure for ADSS cables ("all dielectric self-supporting cables") may be found in the IEEE P1222 standard.

As used herein and unless otherwise specified, reference to the "sheave test" refers the testing procedures outlined as follows:

The sheave test employs a sheave machine having two outboard sheaves (e.g., outboard sheaves having a diameter of about 850 millimeters) and a central sheave having a diameter of no more than about 30× the outer diameter of the cable to be tested.

Initially, a 30-meter test section (i.e., the traversed section) of a cable is installed on the sheave machine. A small load is applied to the cable to remove any slack. The height of the central sheave is adjusted relative to the outboard sheaves so that the angle of the cable from the horizontal is 35° on each side of the central sheave. A 600-lb load is applied to the cable as the cable transverses the central sheave. This step is repeated six times for each test sample.

After testing, the cable jacket (i.e., cable sheath) is removed and the buffer tubes within the cable are observed for damage and permanent deformations. Buffer tubes with permanent deformations of 10 percent or less have sufficient crush resistance (i.e., hoop strength). Buffer tube permanent deformations of 5 percent or less are barely noticeable. In this regard, after being subjected to the aforementioned sheave test, the present loose buffer tubes typically have permanent deformations of less than 10 percent (i.e., with respect to changes in buffer tube diameter). More typically, these deformations are less than about 8 percent (e.g., 5 percent or less).

Moreover, optical-fiber cables containing the present loose buffer tubes typically meet or exceed the Telcordia Technologies generic requirements for compressive strength (6.5.5) as set forth in GR-20-CORE (Issue 2, July 1998; Issue 3, May 2008). This GR-20-CORE requirement with respect to compressive strength (6.5.5) is hereby incorporated by reference in its entirety.

The optical-fiber buffer tubes according to the present invention meet or exceed conventional mid-span testing requirements.

Fiber optic cables suitable for mid-span storage are typically subjected to a mid-span temperature-cycle test, which assures certain minimum performance specifications for fiber optic cables. As noted, one such test can be found in Bulletin 1753F-601 (PE-90) from the United States Department of Agriculture Rural Electrification Administration, hereinafter referred to as the "USDA Rural Electrification Administration mid-span standard," which is hereby incorporated by reference in its entirety.

According to the USDA Rural Electrification Administration mid-span standard, buried and underground loose-tube single-mode cables intended for mid-span applications with tube storage should meet the following mid-span test without exhibiting an increase in fiber attenuation greater than 0.1 dB and a maximum average increase over all fibers of 0.05 dB.

Initially, the test section of the optical-fiber cable is installed in a commercially available pedestal or enclosure or in a device that mimics their performance, as follows: A length of the protective outer jacket, equal to the mid-span length (e.g. 20 feet), is removed from the middle of the test specimen to allow access to the buffer tubes. All binders, tapes, strength members, etc. are removed. The buffer tubes are left intact. The cable ends defining the ends of the mid-span length are properly secured in the enclosure (i.e., as they would be secured within an enclosure in regular commercial use). The strength members are secured with an end-stop type clamp and the protective outer jacket is clamped to prevent slippage. A minimum of 6.096 meters (20 feet) of cable extends from the entry and exit ports of the enclosure (i.e., 20 feet of the cable remain outside of the enclosure), so that optical measurements may be taken. Typically, the buffer tubes are wound in a coil with a minimum width of three (3) inches and minimum length of 12 inches. The exposed buffer tubes are loosely constrained during the test.

The enclosure, with installed cable, is placed in an environmental chamber for temperature cycling. It is acceptable for some or all of the two 20-foot (6.096 meters) cable segments (i.e., the cable segments that remain outside of the enclosure) to extend outside the environmental chamber.

Lids, pedestal enclosures, or closure covers should be removed if possible to allow for temperature equilibrium of the buffer tubes.

The attenuation of the optical fibers is measured at 1550 nanometers ±10 nanometers. The supplier of the optical-fiber cable must certify that the performance of lower specified wavelengths complies with the mid-span performance requirements.

After measuring the attenuation of the optical fibers, the cable is tested per the FOTP-3 temperature-cycling standard. Temperature cycling, measurements, and data reporting must conform to the FOTP-3 standard. The test is conducted for at least five complete cycles. The following detailed test conditions are applied (i.e., using the environmental chamber) to the enclosure containing the optical-fiber cable: (A) loose-tube single-mode optical cable sample shall be tested; (B) an 8-inch to 12-inch diameter optical buried distribution pedestal or a device that mimics their performance shall be tested; (C) mid-span opening for installation of loose-tube single-mode optical cable in pedestal shall be 6.096 meters (20 feet); (D) three hours soak time (i.e., exposure time); (E) Test Condition C-2, minimum −40° C. (−40° F.) and maximum 70° C. (158° F.); (F) a statistically representative amount of transmitting fibers in all expressed buffer tubes passing through the pedestal and stored shall be measured; and (G) the buffer tubes in the enclosure or pedestal shall not be handled or moved during temperature cycling or attenuation measurements.

Fiber cable attenuation measured through the exposed buffer tubes during the last cycle at −40° C. (−40° F.) and +70° C. (158° F.) should not exceed a maximum increase of 0.1 dB and should not exceed a 0.05 dB average across all tested fibers from the initial baseline measurements. At the conclusion of the temperature cycling, the maximum attenuation increase at 23° C. from the initial baseline measurement should not exceed 0.05 dB in order to allow for measurement noise that may be encountered during the test. The cable should also be inspected at room temperature at the conclusion of all measurements. The cable should not show visible evidence of fracture of the buffer tubes nor show any degradation of the exposed cable assemblies.

Additionally, buffer-tube embodiments according to the present invention may be tested under harsher conditions than required by the USDA Rural Electrification Administration mid-span standard. For example, test samples are soaked at 70° C. for 14 hours, which is longer exposure than the three hours required by the testing conditions set forth in the aforementioned USDA bulletin. In addition, only one temperature cycle is performed during this modified USDA Rural Electrification Administration mid-span test.

In this regard, it has been observed that attenuation for the initial temperature cycle tends to be higher than for subsequent temperature cycles. This counterintuitive observation means that testing over one cycle yields higher tested attenuation levels than testing over multiple temperature cycles (e.g., five or more as set forth in the USDA Rural Electrification Administration mid-span standard).

This modified mid-span standard is hereinafter referred to as the "modified USDA Rural Electrification Administration mid-span standard." A longer soak time (i.e., exposure time) may alter the deformation of the buffer tubes because of post-extrusion shrinkage differences at this temperature (i.e., the buffer tubes may shrink in length because of the amorphous orientation generated during the extrusion process and/or crystallization). In accordance with the modified USDA Rural Electrification Administration mid-span standard, an optical-fiber buffer tube is subjected to one temperature cycle of mid-span testing. This includes first measuring attenuation after soaking the optical-fiber buffer tube at 70° C. for 14 hours and thereafter measuring attenuation after soaking the optical-fiber buffer tube at −40° C. for three hours.

Under these harsher conditions, the optical fibers enclosed within the buffer tube exhibit an average change in fiber attenuation of 0.15 dB or less at 1550 nanometers. Typically, the maximum change in fiber attenuation is 0.15 dB or less at 1550 nanometers.

More typically, each of the optical fibers enclosed within the buffer tube has increased attenuation of no more than about 0.1 dB, and the optical fibers enclosed within the buffer tube have a mean increased attenuation of no more than about 0.05 dB.

The attenuation limits of the modified USDA Rural Electrification Administration mid-span standard are higher at 1625 nanometers, but typically less than double (2×) the 1550-nanometer attenuation ceilings.

Another mid-span standard is defined by Telcordia Technologies generic requirements for optical-fiber cables as set forth in GR-20-CORE (Issue 3, May 2008; Mid-Span Buffer Tube Performance of Stranded Cable—6.5.11), hereinafter referred to as the "GR-20-CORE mid-span standard." This GR-20-CORE mid-span standard, which is hereby incorporated by reference, is less rigorous than the foregoing mid-span temperature-cycle test standard defined by the United States Department of Agriculture (USDA) Rural Electrification Administration. Accordingly, the optical-fiber cables that meet the aforementioned Rural Electrification Administration's mid-span temperature-cycle test should also meet or exceed the GR-20-CORE mid-span standard.

To satisfy the GR-20-CORE generic requirements with mid-span buffer tube performance, loose-tube single-mode cables should exhibit an average change in fiber attenuation of no more than 0.15 dB at 1550 nanometers after mid-span testing. According to the generic requirements for optical-fiber cables as set forth in GR-20-CORE (Mid-Span Buffer Tube Performance of Stranded Cable—6.5.11), "[s]tranded loose-tube cables designed to have loose tubes stored in a pedestal or closure shall be capable of having a minimum of 14 feet of expressed buffer tube stored in a pedestal or closure in normal outside plant conditions without experiencing any unacceptable loss in the optical fibers stored in the expressed tubes."

The buffer tubes according to the present invention typically exhibit reduced post-extrusion shrinkage (PES).

Post-extrusion shrinkage determinations can be made using any of three exemplary methods, namely the conventional oven method, an alternative high-resolution oven method, and the thermo-mechanical analyzer method, hereinafter referred to as the "TMA method."

In the conventional oven method, jacket and tube specimens are cut to lengths of 150 millimeters. Initial length ($L_i$) is measured by a micrometer and recorded. Specimens are placed on a bed of talc in aluminum pans and aged in an oven at 85° C. for four hours. After the four-hour aging period specimens are allowed to cool for one hour. The final length ($L_f$) is measured and recorded. Percent shrinkage is calculated as follows: $[(L_i-L_f)/L_i]\times 100$.

In an alternative, high-resolution oven method, jacket and tube specimens are cut to lengths of 3 meters in precisely measured stainless steel tubes just larger than the buffer tube's outer diameter. The tubes are then conditioned in an oven at 95° C. for four hours. After the four-hour aging period, specimens are allowed to cool for at least 30 minutes. The buffer tubes are re-inserted into the stainless steel tubes and the final length (Lf) is measured and recorded. Percent shrinkage is calculated as follows: $[(L_i-L_f)/L_i]\times 100$.

In the TMA method, a small 2-3 millimeter specimen is cut from the jacket or tube and sandwiched between quartz plates before being placed on the TMA sample stage. Initial length in z-axis is measured and recorded by the TMA instrument. Length measurements are recorded at ten data points per second while the specimen is subjected to the following temperature program: (i) equilibrate at 25° C. for 10 minutes; (ii) ramp to −40° C. at 10° C. per minute; (iii) ramp to 85° C. at a rate of 10° C. per minute; and (iv) ramp to −40° C. at a rate of 10° C. per minute. TMA data-analysis software may be used to calculate the shrinkage.

By way of illustration, conventional buffer tubes formed from polypropylene experience post-extrusion shrinkage of about 0.5 percent or more. Moreover, these buffer tubes are subject to additional PES of between about 0.5 and 1.5 percent or more after exposure to high temperatures (e.g., 85° C. for one hour).

In contrast, the buffer tubes (e.g., the buffer tube's polymeric tube or sheath) according to the present invention experience post-extrusion shrinkage of less than about 0.1 percent (e.g., 0.01 percent to 0.05 percent) after exposure to high temperatures (e.g., as measured with the disclosed TMA method or high-resolution oven method).

Moreover, the present buffer tubes typically have excess fiber length (EFL) of less than about 0.25 percent, typically less than about 0.15 percent (e.g., 0.05 percent or less). Excess fiber length may be determined by sectioning a ten-meter sample of the buffer tube that has equilibrated for at least 24 hours after manufacture and thereupon comparing the length of constituent optical fibers against the sectioned ten-meter sample.

Although the foregoing description discusses loose buffer tubes containing discrete optical fibers (i.e., non-ribbonized optical fibers), the present invention also embraces buffer tubes containing optical-fiber ribbons. The prewetting agent should possess an excellent surface affinity, wetting, and/or interfacial adhesion with the outer ribbon matrix material (e.g., a urethane-acrylate composition).

In this regard, optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

It is desirable to increase the density of elements such as optical fibers or optical-fiber ribbons within fiber optic cables. Accordingly, one or more buffer tubes according to the present invention may be positioned within a fiber optic cable.

In this regard, a plurality of the present buffer tubes may be positioned externally adjacent to and stranded around a central strength member. This stranding can be accomplished helically in one direction, known as "S" or "Z" stranding, or via Reverse Oscillated Lay stranding, known as "S-Z" stranding.

Stranding about the central strength member reduces optical fiber strain when cable strain occurs during installation and use. Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a stranding variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of the present buffer tubes may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube (Overton et al.), which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element and commonly assigned U.S. Pat. No. 8,195,018 for a Buffer Tube with Adhesively Coupled Optical Fibers and/or Water-Swellable Element (Overton et al.), each of which is hereby incorporated by reference in its entirety.

As will be understood by those having ordinary skill in the art, a cable enclosing buffer tubes as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method (Lock et al.), and U.S. Pat. No. 7,665,902 for a Modified Pre-Ferrulized Communication Cable Assembly and Installation Method (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Figure 2:
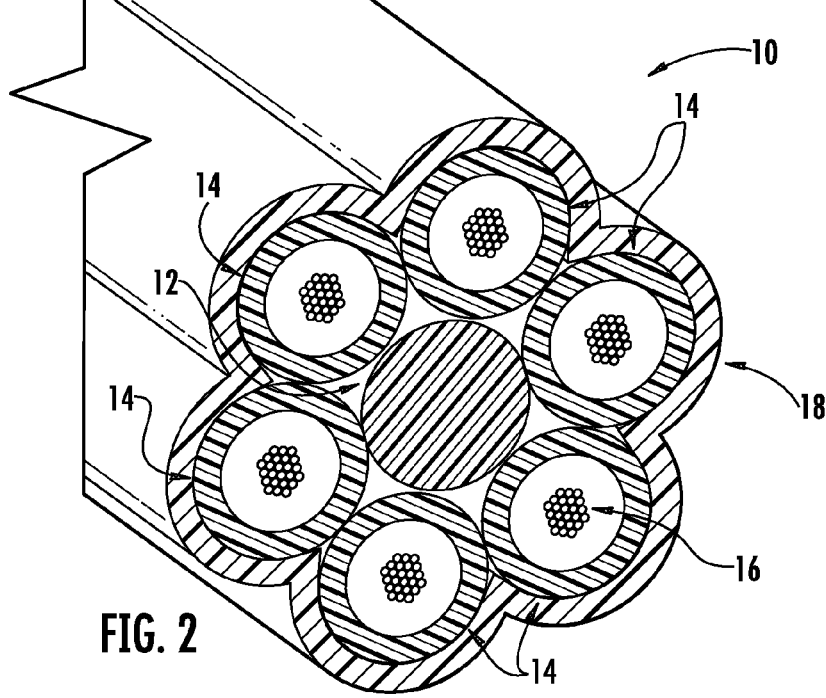
FIG. 2 schematically depicts a perspective, cross-sectional view of an exemplary embodiment of an optical-fiber cable employing buffer tubes according to the present invention.

In accordance with the foregoing, the optical-fiber buffer tubes in accordance with the present invention may be assembled into various optical-fiber cables. With reference to FIGS. 1 and 2, exemplary optical-fiber cables 10 may include a plurality of buffer tubes 14 (e.g., between two and twelve buffer tubes 14, such as six buffer tubes). Exemplary optical-fiber-cable designs are disclosed in commonly assigned U.S. Pat. No. 7,970,247, which is hereby incorporated by reference in its entirety.

The individual buffer tubes 14 are in close proximity to the other buffer tubes 14 and a central strength member 12. For example, in an optical-fiber cable 10 containing six buffer tubes 14, an individual buffer tube 14 may contact two adjacent buffer tubes 14, the central strength member 12, and the protective outer jacket 18 (i.e., the six buffer tubes 14 are positioned around the central strength member 12 as depicted in FIG. 1).

Typically, all of the buffer tubes 14 within a single optical-fiber cable 10 have the same outer diameters and inner diameters. For example, if the optical-fiber cable 10 contains six buffer tubes 14, all six buffer tubes 14 have the same outer diameter and inner diameter. The buffer tubes in accordance with the present invention may have an outer diameter ranging from about 1.3 millimeters to about 3 millimeters (e.g., about 1.50 to 2.55 millimeters). In an exemplary embodiment of the present invention, the buffer tubes 14 may have an outer diameter of about 2.0 millimeters. In another exemplary embodiment, the buffer tubes 14 may have an outer diameter of less than about 3 millimeters (e.g., about 2.5 to 3.0 millimeters). In yet another exemplary embodiment, the buffer tubes 14 may have an outer diameter of 3.0 millimeters and an inner diameter of 2.2 millimeters. That said, buffer tubes having varying inner diameters and varying outer diameters are within the scope of the present invention.

The shapes of the buffer tubes 14 within a single optical-fiber cable 10 may vary (i.e., all of the buffer tubes 14 are not required to have the same shape).

The optical fibers 16, which are coated with a thin layer of prewetting agent in accordance with the present invention, may be distributed evenly among the buffer tubes 14 (i.e., each tube 14 contains an equal number of optical fibers 16). For example, an optical-fiber cable 10 containing 144 optical fibers 16 and six buffer tubes 14 may have twenty four optical fibers 16 per buffer tube 14. In one exemplary embodiment, the optical-fiber cable 10 includes twelve buffer tubes 14, each buffer tube containing twenty four, prewet optical fibers 16.

The buffer tubes 14 containing the optical fibers 16 may be stranded around the central strength member 12. For example, the buffer tubes 14 can be positioned externally adjacent to and stranded around the central strength member 12. The stranding can be accomplished in one direction, helically, known as "S" stranding, or Reverse Oscillated Lay stranding, known as "S-Z" stranding. Stranding about the central strength member 12 increases the operational and installation flexibility of the optical-fiber cable 10. S-Z stranding, for example, allows easy unraveling of the buffer tubes 14 for mid-span access.

In other embodiments, the buffer tubes 14 containing the optical fibers 16 are simply placed externally adjacent to the central strength member 12 (i.e., the buffer tubes 14 are not intentionally stranded or arranged around the central strength member 12 in a particular manner and run substantially parallel to the central strength member 12).

Optical-fiber cables 10 according to the present invention also typically include a protective outer jacket 18 provided around the buffer tubes 14 containing optical fibers 16. In some embodiments, the protective outer jacket 18 maintains a substantially uniform thickness over the length of the optical-fiber cable 10. The thickness of the protective outer jacket 18 may be adjusted to reduce or increase the overall diameter of the optical-fiber cable 10 or to provide greater protection to the optical-fiber cable 10. In one embodiment, the protective outer jacket 18 is 0.6 millimeter thick.

The protective outer jacket 18 may fit tightly around and conform to the outside of the other elements of the optical-fiber cable 10 (e.g. the buffer tubes 14) in such a way that it substantially fills the interstices (i.e., the gaps) between adjacent buffer tubes 14. See FIG. 2. In this particular embodiment, the protective outer jacket 18 is thin (e.g., 0.6 millimeter thick or so) so that the external surface of the optical-fiber cable 10 varies in distance from the center of the optical-fiber cable 10 (i.e., it is textured rather than smooth).

In some embodiments including a thin protective outer jacket 18, the buffer tubes 14 are stranded (e.g., S stranded or S-Z stranded) around the central strength member 12. In such embodiments, the textured outer surface of the optical-fiber cable 10 periodically varies lengthwise along the cable 10 in a manner that replicates the stranded shape of the underlying buffer tubes 14. The textured profile of the protective outer jacket 18 of this embodiment further improves the blowing performance of the optical-fiber cable 10. The textured surface reduces the contact surface between the cable 10 and the microduct and increases the friction between the blowing medium (e.g., air or liquid) and the cable 10.

The protective outer jacket 18 may be made of a low coefficient-of-friction material, which can facilitate blown installation. Yet, in other embodiments, the protective outer jacket 18 can be provided with a lubricant to further facilitate blown installation. The protective outer jacket 18 may include other materials known by those having ordinary skill in the art to be suitable for use as a protective outer jacket 18 (e.g., polymeric materials such as PVC or nylons).

FIG. 1 depicts a cross-sectional view of an exemplary embodiment of an optical-fiber cable 10 in accordance with the present invention. Those having ordinary skill in the art will appreciate that FIG. 1 is a schematic representation that is not necessarily drawn to scale.

In this cabling embodiment, the optical-fiber cable 10 includes a central strength member 12 positioned at the middle of the optical-fiber cable 10. Buffer tubes 14 are provided externally adjacent to the central strength member 12. Each buffer tube 14 contains an equal number of optical fibers 16. Finally, a protective outer jacket 18 is provided around the buffer tubes 14 and the central strength member 12.

The optical fibers 16 may be loosely placed in the buffer tubes 14. Because the optical fibers 16 typically bunch together within the buffer tubes 14, the optical fibers 16 are depicted in FIG. 1 as centrally located bundles within the buffer tubes 14. This bundling is achieved concurrently with the application of the prewetting agent to the optical fibers 16. As noted, a water-swellable yarn (not shown) may be helically wrapped around the optical fibers 16. Despite this bundling, the optical-fiber cable 10 is considered to be a loose-tube optical-fiber cable.

FIG. 2 schematically depicts a cross-sectional, perspective view of another exemplary embodiment of an optical-fiber cable in accordance with the present invention. Those having ordinary skill in the art will appreciate that FIG. 2 is a schematic representation that is not necessarily drawn to scale.

The embodiment depicted in FIG. 2 contains the same elements depicted in FIG. 1 (i.e. optical-fiber cable 10, buffer tubes 14, central strength member 12, optical fibers 16, and protective outer jacket 18). In this embodiment, however, the protective outer jacket 18 fits tightly around and conforms to the outside of the buffer tubes 14 in such a way that it substantially fills the gaps between adjacent buffer tubes 14. In this particular embodiment, the protective outer jacket 18 is thin (e.g., 0.6 millimeter thick or so) so that the external surface of the optical-fiber cable 10 is textured rather than smooth.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber (Overton); U.S. Pat. No. 8,265,442 for a Microbend-Resistant Optical Fiber (Overton); U.S. Pat. No. 8,145,025 for a Single-Mode Optical Fiber Having Reduced Bending Losses (de Montmorillon et al.); U.S. Pat. No. 7,889,960 for a Bend-Insensitive Single-Mode Optical Fiber (de Montmorillon et al.); U.S. Patent Application Publication No. US2010/0021170 A1 for a Wavelength Multiplexed Optical System with Multimode Optical Fibers (Lumineau et al.); U.S. Pat. No. 7,995,888 for a Multimode Optical Fibers (Gholami et al.); U.S. Patent Application Publication No. US2010/0119202 A1 for a Reduced-Diameter Optical Fiber (Overton); U.S. Patent Application Publication No. US2010/0142969 A1 for a Multimode Optical System (Gholami et al.); U.S. Pat. No. 8,259,389 for an Amplifying Optical Fiber and Method of Manufacturing (Pastouret et al.); U.S. Patent Application Publication No. US2010/0135627 A1 for an Amplifying Optical Fiber and Production Method (Pastouret et al.); U.S. Patent Application Publication No. US2010/0142033 for an Ionizing Radiation-Resistant Optical Fiber Amplifier (Regnier et al.); U.S. Pat. No. 8,274,647 for a Method of Classifying a Graded-Index Multimode Optical Fiber (Gholami et al.); U.S. Patent Application Publication No. US2010/0189397 A1 for a Single-Mode Optical Fiber (Richard et al.); U.S. Pat. No. 8,290,324 for a Single-Mode Optical Fiber Having an Enlarged Effective Area (Sillard et al.); U.S. Pat. No. 8,301,000 for a Single-Mode Optical Fiber (Sillard et al.); U.S. Patent Application Publication No. US2010/0214649 A1 for an Optical Fiber Amplifier Having Nanostructures (Burow et al.); U.S. Pat. No. 8,009,950 for a Multimode Fiber (Molin et al.); U.S. Patent Application Publication No. US2010/0310218 A1 for a Large Bandwidth Multimode Optical Fiber Having a Reduced Cladding Effect (Molin et al.); U.S. Patent Application Publication No. US2011/0058781 A1 for a Multimode Optical Fiber Having Improved Bending Losses (Molin et al.); U.S. Pat. No. 8,340,488 for a Multimode Optical Fiber (Molin et al.); U.S. Patent Application Publication No. US2011/0069724 A1 for an Optical Fiber for Sum-Frequency Generation (Richard et al.); U.S. Patent Application Publication No. US2011/0116160 A1 for a Rare-Earth-Doped Optical Fiber Having Small Numerical Aperture (Boivin et al.); U.S. Pat. No. 8,280,213 for a High-Bandwidth, Multimode Optical Fiber with Reduced Cladding Effect (Molin et al.); U.S. Patent Application Publication No. US2011/0123162 A1 for a High-Bandwidth, Dual-Trench-Assisted Multimode Optical Fiber (Molin et al.); U.S. Pat. No. 8,406,593 for a Multimode Optical Fiber with Low Bending Losses and Reduced Cladding Effect (Molin et al.); U.S. Patent Application Publication No. US2011/0135263 A1 for a High-Bandwidth Multimode Optical Fiber Having Reduced Bending Losses (Molin et al.); U.S. Patent Application Publication No. US2011/0188826 A1 for a Non-Zero Dispersion Shifted Optical Fiber Having a Large Effective Area (Sillard et al.); U.S. Patent Application Publication No. US2011/0188823 A1 for a Non-Zero Dispersion Shifted Optical Fiber Having a Short Cutoff Wavelength (Sillard et al.); U.S. Patent Application Publication No. 2011/0217012 A1 for a Broad-Bandwidth Multimode Optical Fiber Having Reduced Bending Losses (Bigot-Astruc et al.); U.S. Patent Application Publication No. 2011/0229101 A1 for a Single-Mode Optical Fiber (de Montmorillon et al.); U.S. Patent Application Publication No. 2012/0051703 A1 for a Single-Mode Optical Fiber (Bigot-Astruc et al.); U.S. Patent Application Publication No. 2012/0040184 A1 for a Method of Fabricating an Optical Fiber Preform (de Montmorillon et al.); U.S. Patent Application Publication No. 2012/0092651 A1 for a Multimode Optical Fiber Insensitive to Bending Losses (Molin et al.); U.S. Patent Application Publication No. 2012/0134376 A1 for a Radiation-Insensitive Optical Fiber Doped with Rare Earths (Burov et al.); U.S. Patent Application Publication No. 2012/0148206 A1 for a Rare-Earth-Doped Optical Fiber (Boivin et al.); U.S. Patent Application Publication No. 2012/0195549 A1 for a Broad-Bandwidth Optical Fiber (Molin et al.); U.S. Pat. No. 8,391,661 for a Multimode Optical Fiber (Molin et al.); U.S. Patent Application Publication No. 2012/0224254 A1 for a Rare-Earth-Doped Amplifying Optical Fiber (Burov et al.); U.S. PatenApplication Publication No. 2012/0243843 A1 for a Bend-Resistant Multimode Optical Fiber, (Molin et al.); U.S. Patent Application Publication No. 2012/0251062 A1 for a Multimode Optical Fiber, (Molin et al.); U.S. Patent Application Publication No. 2012/0275751 A1 for a High-Bandwidth, Radiation-Resistant Multimode Optical Fiber, (Krabshuis et al.); U.S. Patent Application Publication No. 2012/0301093 A1 for a Single-Mode Optical Fiber, (Sillard et al.); U.S. Patent Application Publication No. 2012/0315006 A1 for a Single-Mode Optical Fiber, (Sillard et al.) U.S. Patent Application Publication No. 2013/0004135 for a Multimode Optical Fiber, (Bigot-Astruc et al.); U.S. Patent Application Publication No. 2013/0028564 A1 for a Trench-Assisted Multimode Optical Fiber, (Molin); and U.S. patent application Ser. No. 13/657,251 for an Hydrogen-Sensing Optical Fiber, filed Oct. 22, 2012, (Burow et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels (Lookadoo et al.); U.S. Patent Application Publication No. US2009/0297107 A1 for an Optical Fiber Telecommunication Cable (Tatat); U.S. Pat. No. 8,195,018 for a Buffer Tube with Adhesively Coupled Optical Fibers and/or Water-Swellable Element; U.S. Pat. No. 8,401,353 for an Optical Fiber Cable Assembly (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments (Overton); U.S. Pat. No. 8,041,167 for an Optical Fiber Loose Tube Cables (Overton); U.S. Pat. No. 8,145,026 for a Reduced-Size Flat Drop Cable (Overton et al.); U.S. Pat. No. 8,165,439 for ADSS Cables with High-Performance Optical Fiber (Overton); U.S. Pat. No. 8,041,168 for Reduced-Diameter Ribbon Cables with High-Performance Optical Fiber (Overton); U.S. Pat. No. 8,031,997 for a Reduced-Diameter, Easy-Access Loose Tube Cable (Overton); U.S. Pat. No. 8,346,040 for a Buffered Optical Fiber (Testu et al.); U.S. Patent Application Publication No. US2010/0154479 A1 for a Method and Device for Manufacturing an Optical Preform (Milicevic et al.); U.S. Patent Application Publication No. US2010/0166375 for a Perforated Water-Blocking Element (Parris); U.S. Pat. No. 8,314,408 for a UVLED Apparatus for Curing Glass-Fiber Coatings (Hartsuiker et al.); U.S. Patent Application Publication No. US2010/0202741 A1 for a Central-Tube Cable with High-Conductivity Conductors Encapsulated with High-Dielectric-Strength Insulation (Ryan et al.); U.S. Patent Application Publication No. US2010/0215328 A1 for a Cable Having Lubricated, Extractable Elements (Tatat et al.); U.S. Patent Application Publication No. US2011/0026889 A1 for a Tight-Buffered Optical Fiber Unit Having Improved Accessibility (Risch et al.); U.S. Pat. No. 8,306,380 for Methods and Devices for Cable Insertion into Latched Conduit (Leatherman et al.); U.S. Patent Application Publication No. 2011/0069932 A1 for a High-Fiber-Density Optical-Fiber Cable (Overton et al.); U.S. Patent Application Publication No. 2011/0091171 A1 for an Optical-Fiber Cable Having High Fiber Count and High Fiber Density (Tatat et al.); U.S. Patent Application Publication No. 2011/0176782 A1 for a Water-Soluble Water-Blocking Element (Parris); U.S. Patent Application Publication No. 2011/0268400 A1 for a Data-Center Cable (Louie et al.); U.S. Patent Application Publication No. 2011/0268398 A1 for a Bundled Fiber Optic Cables (Quinn et al.); U.S. Patent Application Publication No. 2011/0287195 A1 for a Curing Apparatus Employing Angled UVLEDs (Molin); U.S. Patent Application Publication No. 2012/0009358 for a Curing Apparatus Having UV Sources That Emit Differing Ranges of UV Radiation (Gharbi et al.); U.S. Patent Application Publication No. 2012/0014652 A1 for a Adhesively Coupled Optical Fibers and Enclosing Tape (Parris); U.S. Patent Application Publication No. 2012/0040105 A1 for a Method and Apparatus Providing Increased UVLED Intensity (Overton); U.S. Patent Application Publication No. 2012/0057833 A1 for an Optical-Fiber Module Having Improved Accessibility (Tatat); U.S. Patent Application Publication No. 2012/0213483 A1 for an Optical-Fiber Interconnect Cable (Risch et al.); and U.S. patent application Ser. No. 13/683,555 for a PCVD Method and Apparatus, filed Nov. 21, 2012, (Milicevic et al.); and U.S. patent application Ser. No. 13/768,280 for a Loose-Tube Optical-Fiber Cable, filed Feb. 15, 2013, (Lowell et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. An optical-fiber buffer tube, comprising:
an optical fiber comprising (i) a glass fiber and (ii) one or more optical-fiber coating layers surrounding said glass fiber, said one or more optical-fiber coating layers defining an outermost optical-fiber coating layer, wherein said optical fiber's outermost optical-fiber coating layer is a urethane-acrylate composition;
a chemically modified polydimethylsiloxane prewetting agent applied to said optical fiber's outermost optical-fiber coating layer, wherein, at standard temperature and pressure of 20° C. and 1 atmosphere, said prewetting agent has an interfacial adhesion with said optical fiber's outermost optical-fiber coating layer of at least about 2.4 dynes/cm$^2$; and
a polymeric sheath enclosing (i) said optical fiber and (ii) said prewetting agent applied to said optical fiber's outermost optical-fiber coating layer.
2. The optical-fiber buffer tube according to claim 1, wherein said prewetting agent has an interfacial adhesion with said optical fiber's outermost optical-fiber coating layer of at least about 2.55 dynes/cm².

3. The optical-fiber buffer tube according to claim 1, wherein said polymeric sheath encloses a plurality of optical fibers such that said buffer tube possesses a filling coefficient of between about 0.3 and 0.5, and, upon subjecting said buffer tube to the mid-span testing according to the USDA Rural Electrification Administration mid-span standard, (i) each of said optical fibers enclosed within said buffer tube has increased attenuation of no more than about 0.1 dB and (ii) said optical fibers enclosed within said buffer tube have a mean increased attenuation of no more than about 0.05 dB.

4. The optical-fiber buffer tube according to claim 1, wherein said polymeric sheath encloses a plurality of optical fibers such that said buffer tube possesses a filling coefficient of at least about 0.35, and, upon subjecting said buffer tube to one temperature cycle of the mid-span testing according to the modified USDA Rural Electrification Administration mid-span standard, which includes first measuring attenuation after soaking said buffer tube at 70° C. for 14 hours and thereafter measuring attenuation after soaking said buffer tube at −40° C. for three hours, said optical fibers possess an average change in optical-fiber attenuation of about 0.15 dB or less at 1550 nanometers.

5. The optical-fiber buffer tube according to claim 1, wherein said buffer tube exhibits excess fiber length (EFL) of no more than about 0.25 percent.

6. The optical-fiber buffer tube according to claim 1, wherein, upon subjecting said buffer tube to post-extrusion-shrinkage testing in accordance with the TMA method, said polymeric sheath exhibits post-extrusion shrinkage (PES) of no more than about 0.1 percent.

7. An optical-fiber buffer tube, comprising:
a polymeric tube defining an annular space;
a plurality of optical fibers positioned within the annular space of said polymeric tube, each optical fiber comprising a glass fiber and an outermost, urethane-acrylate optical-fiber coating surrounding said glass fiber; and
a functionalized-silicone prewetting agent adhering to said plurality of optical fibers,
wherein, at standard temperature and pressure of 20° C. and 1 atmosphere, said prewetting agent has an interfacial adhesion with said outermost, urethane-acrylate optical-fiber coating of at least about 2.5 dynes/cm²;
wherein the annular space of said polymeric tube is substantially free of thixotropic water-blocking compositions; and
wherein said optical-fiber buffer tube possesses a buffer-tube filling coefficient of at least about 0.30.

8. The optical-fiber buffer tube according to claim 7, wherein said prewetting agent is chemically modified polydimethylsiloxane, said prewetting agent having an interfacial adhesion with said optical fiber's outermost, urethane-acrylate optical-fiber coating of between about 2.6 dynes/cm² and 2.9 dynes/cm².

9. The optical-fiber buffer tube according to claim 7, wherein, upon subjecting said optical-fiber buffer tube to the mid-span testing according to the USDA Rural Electrification Administration mid-span standard, (i) each of said optical fibers enclosed within said optical-fiber buffer tube has increased attenuation of no more than about 0.1 dB and (ii) said optical fibers enclosed within said optical-fiber buffer tube have a mean increased attenuation of no more than about 0.05 dB.

10. The optical-fiber buffer tube according to claim 7, wherein said optical-fiber buffer tube possesses a filling coefficient of at least about 0.40, and, upon subjecting said optical-fiber buffer tube to one temperature cycle of the mid-span testing according to the modified USDA Rural Electrification Administration mid-span standard, which includes first measuring attenuation after soaking said optical-fiber buffer tube at 70° C. for 14 hours and thereafter measuring attenuation after soaking said optical-fiber buffer tube at −40° C. for three hours, (i) each of said optical fibers enclosed within said optical-fiber buffer tube has increased attenuation of no more than about 0.1 dB and (ii) said optical fibers enclosed within said optical-fiber buffer tube have a mean increased attenuation of no more than about 0.05 dB.

11. The optical-fiber buffer tube according to claim 7, said optical-fiber buffer tube possessing a filling coefficient of at least about 0.45.

12. The optical-fiber buffer tube according to claim 7, wherein (i) said optical-fiber buffer tube exhibits excess fiber length (EFL) of no more than about 0.15 percent, and (ii), upon subjecting said optical-fiber buffer tube to post-extrusion-shrinkage testing in accordance with the TMA method, said polymeric tube exhibits post-extrusion shrinkage (PES) of no more than about 0.05 percent.

13. An optical-fiber buffer tube, comprising:
a polymeric sheath defining an annular space;
an optical fiber comprising (i) a glass fiber and (ii) one or more optical-fiber coating layers surrounding said glass fiber, said one or more optical-fiber coating layers defining an outermost optical-fiber coating layer, wherein said optical fiber's outermost optical-fiber coating layer is a urethane-acrylate composition; and
a chemically modified polydimethylsiloxane prewetting agent applied to said optical fiber's outermost optical-fiber coating layer, wherein, at standard temperature and pressure of 20° C. and 1 atmosphere, said prewetting agent has an interfacial adhesion with said optical fiber's outermost optical-fiber coating layer of 2.35 dynes/cm² or more;
wherein said polymeric sheath encloses within its annular space (i) said optical fiber and (ii) said prewetting agent applied to said optical fiber's outermost optical-fiber coating layer;
wherein said polymeric tube's annular space is substantially free of thixotropic water-blocking compositions.

14. The optical-fiber buffer tube according to claim 13, wherein
said prewetting agent has an interfacial adhesion with said optical fiber's outermost optical-fiber coating layer of between 2.45 dynes/cm² and 2.95 dynes/cm².

15. The optical-fiber buffer tube according to claim 13, wherein
said prewetting agent has an interfacial adhesion with said optical fiber's outermost optical-fiber coating layer of at least about 2.65 dynes/cm².

16. The optical-fiber buffer tube according to claim 13, wherein said polymeric sheath encloses within its annular space a plurality of optical fibers such that said buffer tube possesses a filling coefficient of between about 0.3 and 0.5, and, upon subjecting said buffer tube to the mid-span testing according to the USDA Rural Electrification Administration mid-span standard, (i) each of said optical fibers enclosed within said buffer tube has increased attenuation of no more than about 0.1 dB and (ii) said optical fibers enclosed within said buffer tube have a mean increased attenuation of no more than about 0.05 dB.

17. The optical-fiber buffer tube according to claim 13, wherein said polymeric sheath encloses within its annular space a plurality of optical fibers such that said buffer tube possesses a filling coefficient of at least about 0.35, and, upon subjecting said buffer tube to one temperature cycle of the mid-span testing according to the modified USDA Rural Electrification Administration mid-span standard, which includes first measuring attenuation after soaking said buffer tube at 70° C. for 14 hours and thereafter measuring attenuation after soaking said buffer tube at −40° C. for three hours, said optical fibers possess an average change in optical-fiber attenuation of about 0.15 dB or less at 1550 nanometers.

18. The optical-fiber buffer tube according to claim 13, wherein said buffer tube exhibits excess fiber length (EFL) of no more than about 0.25 percent.

19. The optical-fiber buffer tube according to claim 13, wherein, upon subjecting said buffer tube to post-extrusion-shrinkage testing in accordance with the TMA method, said polymeric sheath exhibits post-extrusion shrinkage (PES) of no more than about 0.1 percent.

20. The optical-fiber buffer tube according to claim 13, wherein said polymeric sheath encloses within its annular space a water-blocking element surrounding a plurality of optical fibers.

\* \* \* \* \*